Nov. 4, 1958     K. D. ASHLEY ET AL     2,859,184
PROCESS OF MANUFACTURE OF SILICA ALUMINA CATALYST
Filed April 3, 1952
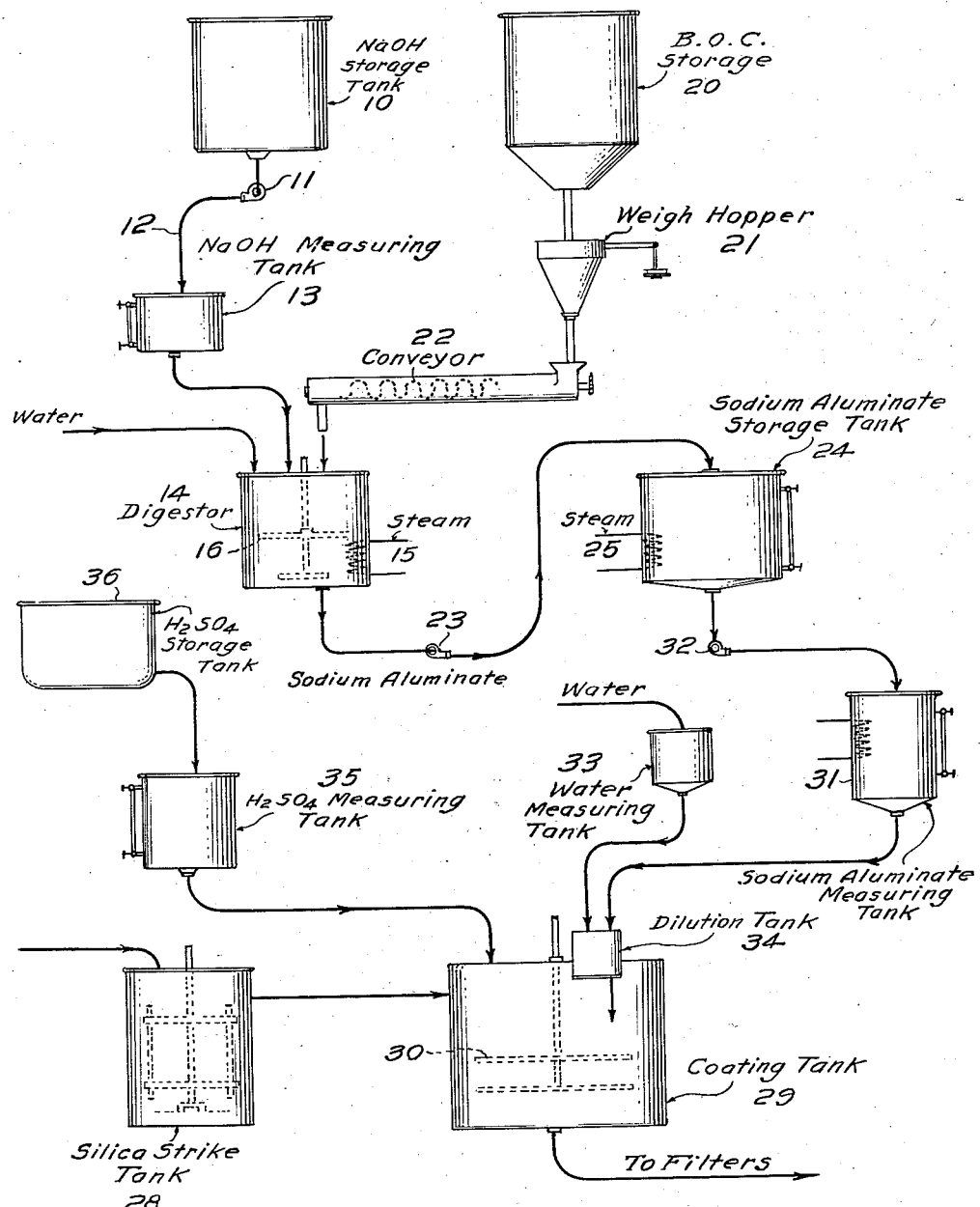
INVENTORS
KENNETH D. ASHLEY,
WILLIAM E. SANBORN,
BY Alexander T. Kardos.
ATTORNEY

United States Patent Office 2,859,184
Patented Nov. 4, 1958

2,859,184

PROCESS OF MANUFACTURE OF SILICA ALUMINA CATALYST

Kenneth D. Ashley, Stamford, and William E. Sanborn, Rowayton, Conn., assignors to American Cyanamid Company, New York, N. Y., a corporation of Maine Application April 3, 1952, Serial No. 280,422

12 Claims. (Cl. 252—453)

This invention relates to the manufacture of adsorbent gels such as are used as catalysts, and more particularly to the manufacture of gel-type catalysts containing oxides of silicon and aluminum.

While the principles of the invention may be applied to the production of gel-type catalysts for any purpose, they are particularly useful in the manufacture of cracking catalysts, dehydration catalysts, and hydrogenation and dehydrogenation catalysts, such as those employed for the catalytic dehydrogenation, cracking, or catalytic reforming of petroleum fractions, or for the production of butadiene or of high octane gasoline and those used for dehydrating glycols such as 1,4,-, 2,4- or 2,3-butylene glycols to butadiene. Catalysts prepared by the processes of the present invention may also be used for the production of olefins of higher molecular weight by the dehydrogenation of higher boiling petroleum fractions such as still bottoms.

Hitherto, several methods have been employed in the preparation of silica-alumina gel-type catalysts. According to one general method in widespread use, hydrated silica may be precipitated from a dilute solution of an alkali metal silicate, such as commercial water glass, by acidification with a mineral acid, for example, sulfuric acid. The precipitated hydrated silica may then be suspended in an aqueous solution containing an aluminum salt, such as aluminum sulfate or aluminum nitrate, and hydrated alumina may then be precipitated on the hydrated silica by the addition of a basic compound, such as ammonia, whereby a silica-alumina slurry is formed which is adapted to be converted by drying and calcining into a gel-type catalyst intended for the above-mentioned purposes.

During the preparation of the silica-alumina gel and particularly during the acidification of the sodium silicate by the sulfuric acid and the alkalinizing of the aluminum salt by the ammonia, alkali metal compounds and water-soluble salts, such as sulfates and ammonium salts, are unavoidably incorporated into the precipitated silica-alumina gelatinous material. It is a requirement of the petroleum industry that these gel-type catalysts be substantially free of such alkali metal and other water-soluble salts inasmuch as such compounds might act as a flux in the finished catalyst composition. This requirement has been brought about by the definite determination that their exclusion or removal is necessary, if catalysts of acceptable initial activity and thermal stability are to be obtained.

This is particularly true as regards the alkali metal salts which in most cases will be sodium salts because sodium silicate is comparatively inexpensive and is one of the most readily available raw materials for the manufacture of hydrated silica gel. Without being bound to any particular theory as to the precise reasons for the decrease in initial activity and thermal stability due to the presence of sodium, it is believed that its presence may cause a sintering or fusion of the surfaces of the gel during the drying or calcining period so that the porosity of the catalyst particles is considerably reduced with a corresponding decrease in the effective catalytic area thereof, assuming that the catalytic effects are due at least partially to porosity, capillarity and surface area of the product and thus directly proportional to the total effective catalytic area.

It is, however, extremely difficult to remove these objectionable impurities from hydrated gels to the extent desired or necessary for catalytic purposes except by time-consuming procedures including repeated filtration and washing. Such may involve, for example, successive washings with various acid and salt solutions and has proven to be a tedious and expensive operation. Moreover, these impurities, and particularly the alkali metal compounds, are adsorbed so strongly by the continuous gelatinous coating of silica and alumina on a filter that large quantities of washing fluids are necessary for their removal. Furthermore, the slow rate of penetration of the washing fluids through a filter cloth coated with a layer of gelatinous material requires considerable time and has increased still further the difficulties in carrying out this method.

It is also to be noted that several of the materials employed in the process, for example, sulfuric acid, are not too plentiful and frequently have been in short supply. As a consequence, all too often cut-backs or halts in the manufacturing operation have had to be resorted to because of the lack of availability of required materials. The need for readily available sources of raw materials has therefore become an important commercial consideration in such processes.

Another important commercial factor to be observed in the above described prior art process is the fact that many of the raw materials used are not inexpensive. This price-factor of commercially used catalysts has become increasingly important due to the ever-growing demands of the petroleum industry for catalysts in larger and larger quantities. As a consequence, processes hitherto considered highly acceptable to the industry have been carefully reviewed with the purpose in mind of effecting cost economies.

It is a principal object of the present invention to provide methods of manufacturing gel-type catalysts containing active silica and alumina which catalysts are substantially free of impurities such as alkali metal compounds and water-soluble salts so as to be acceptable in the petroleum industry.

A further principal object of the present invention is to provide methods of manufacturing gel-type catalysts, which methods shall involve the use of raw materials, either in smaller quantities, or under such conditions that such materials may be more readily removed by washing and filtering.

It is also a principal object of the present invention to provide improved methods for the manufacture of silica-alumina catalysts which methods shall be capable of using readily available raw materials.

Another principal object of the present invention is to provide a manufacturing process for silica-alumina gel-type catalysts adapted to use raw materials which are relatively inexpensive whereby great cost economies are effected.

These objects are accomplished by the improved methods of the present invention for forming a silica-alumina slurry suitable for conversion into a gel-type catalyst. We have found that, by properly controlling the chemical reaction between an alkali metal aluminate and an acid in an aqueous suspension of previously precipitated hydrated silica, hydrated alumina may be precipitated on the hydrated silica to form a composite gelatinous material from which undesirable alkali metal and other water-soluble salts may be readily removed by washing and filtering without undue complications. This situation is possible, notwithstanding the presence in larger amounts of such alkali metal salts which may be introduced during the preparation of the silica gel and of the alkali metal aluminate. Additionally, the situation is further ameliorated by the presence in lesser amounts of the other soluble salts, introduced by the use of lesser amounts of mineral acids. We have further found that, as a consequence of such unexpected properties, the silica-alumina catalysts resulting from later drying and dehydrating by heat of the composite gelatinous materials possess catalytic activity and thermal stability equal or superior to catalysts in current use.

The application of these discoveries to our improved methods for the manufacture of silica-alumina catalysts suitable for use in hydrocarbon cracking and conversion reactions will be illustrated by the following description of a preferred method of catalyst manufacture with reference to the accompanying drawing.

The drawing is a schematic flow sheet in which the details of our preferred process are diagrammatically illustrated by tanks and flow lines, but it is to be understood that the invention in its broader aspects is not to be construed as limited thereto.

In carrying out the preferred embodiment of our process illustrated in the drawing, we first provide a large storage tank 10 for holding a sufficient quantity of reserve alkali. For the purpose of illustrating this invention, 50% sodium hydroxide has been selected but it is apparent that potassium hydroxide or other alkali metal hydroxides may be used, as well as concentrations other than 50%. A pump 11 and feed lines 12 are provided whereby the sodium hydroxide may be fed into an alkali measuring tank 13 for controlling and feeding the proper quantity of NaOH into a digestor 14. Steam lines 15 are provided to heat the contents of the digestor 14 to the required temperature and an agitator 16 is mounted in the digestor 14 to insure proper mixing of the reactants.

A large storage bin or receptacle 20 is provided for bauxite ore concentrate (aluminate trihydrate of commerce) which may be fed by gravity or by a mechanical device (not shown) into a weigh hopper 21 where the proper quantity of bauxite ore concentrate is accurately determined for feeding through a conveyor 22 at a desired rate into the digestor 14.

The caustic is first fed into the digestor 14 and is heated to a temperature sufficient to promote the digestion of the bauxite ore concentrate to form sodium aluminate. When the caustic has been heated to approximately 100°–105° C., the bauxite ore concentrate may then be added with the steam on in the digestor. The temperature may then be increased to 110°–112° C., and then more gradually to 117° C., and held thereat. These temperature ranges for the digestion of the bauxite ore concentrate by the caustic are merely illustrative of the invention and may be varied within reasonable limits, provided satisfactory digestion conditions prevail. When digestion is completed, water should be added slowly into the vortex caused by the agitator 16 until the desired quantities and concentrations are reached.

For a desirable long range stability in a sodium aluminate solution having a preferred 10–20% excess by weight of sodium hydroxide, it has been found that the proportions of the reactants should be such that a 25–30% concentration by weight of $Al_2O_3$ is obtained in the sodium aluminate. For a concentration of 25% $Al_2O_3$, it has been determined that approximately a 16.6–18.3% concentration of $Na_2O$ is preferred for stability reasons. Similarly, for a concentration of 30% $Al_2O_3$, it has been determined that a 19.9–21.6% $Na_2O$ is preferred for stability reasons.

It is to be realized that these figures primarily represent preferential values, determined to some extent by the stability range preferred and other factors dependent upon the particular circumstances or intended purposes of the finished catalyst.

The sodium aluminate may be fed by a pump 23 to a storage tank 24 which is heated by steam coils 25 whereby the sodium aluminate may be maintained at a temperature at or preferably above 75° C., in order to keep it fluid enough to pump. If desired, the pipe lines and pumps should be lagged and traced with a steam pipe to prevent the sodium aluminate from cooling to a temperature below 75° C.

A coating tank 29 equipped with an agitator 30 is provided and a batch of hydrated silica in aqueous suspension, containing about 3–6% of gelatinous silica after acidification and prepared in a precipitation or strike tank 28 and properly aged for 10–30 minutes, or longer if required or desired, is fed thereinto. The precise method of preparation of the silica gel does not form an essential part of the present invention and any preferred method of preparation may be selected. For the purposes of the present invention, the general methods disclosed in United States Patent Nos. 2,411,820 and 2,478,519 for the preparation of a silica gel have been employed but such is not to be construed as limitative of the methods capable of use.

A predetermined quantity of sodium aluminate is withdrawn from the storage tank 24 and is fed into a steam-heated measuring tank 31 by a pump 32 and is held in readiness to be added to the hydrated silica in the coating tank 29. The sodium aluminate in the measuring tank 31 is maintained at a temperature above 75° C. but preferably approximately 90° C. for a closer volumetric control, and then may be run into the coating tank 29. If it is desired to dilute the sodium aluminate to any desired concentration of $Al_2O_3$, the sodium aluminate may first be run into a dilution tank 34 adjacent the coating tank 29 and emptying thereinto through a normally open orifice. At the same time, a water measuring tank 33 which had previously been filled to a predetermined level as required for the desired dilution discharges its contents into the dilution tank 34 simultaneously with the addition of the sodium aluminate thereinto and the rates of both are so adjusted that they are mixed together in the dilution tank and are discharged through a normally open orifice therein into the coating tank 29.

An acid measuring tank 35 is provided and an amount of acid is run thereinto from an acid storage tank 36. The amount of acid in the measuring tank 35 is such that, when it is completely discharged into the coating tank 29, there is sufficient to neutralize the sodium aluminate to precipitate the aluminum hydroxide upon the hydrated silica in aqueous suspension and to bring the final pH of the resulting slurry down to approximately 4.0–5.5. As used herein, the term "neutralizing the sodium aluminate" is intended to include the neutralizing of the free and combined sodium hydroxide therein down to a pH of approximately 8.0. Should the acid be added to the hydrated silica prior to the addition of the sodium aluminate, the pH of the resulting mixture will fall to below 4.0 and perhaps as low as 0.5 but this will be raised by the later addition of the sodium aluminate and the process will continue in a satisfactory fashion.

Preferably, however, all but a few gallons of acid are added to bring the pH just above the desired final range of acidity and the last few gallons may then be added slowly so that the final pH may be preferably adjusted to 4.7. The gelatinous silica-alumina slurry is then ready for washing and filtering in the usual manner, followed by drying and calcining, such as set forth in U. S. Patents 2,411,820 and 2,478,519.

If desired, the final pH of the silica-alumina slurry need not necessarily be reduced to as low as 4.0–5.5, as set forth above, but may be as high as 8 where such a pH will not interfere with the later processing treatments of filtering, washing and drying. For example, a silica-alumina slurry having a pH in the range 4–8 may be first filtered after the alumina precipitation to remove any surplus liquid present along with any ammonium sulfate, sodium sulfate, or other impurities contained therein. The resulting cake, which still contains approximately 80–85% water, may be broken up into small pieces such as —30 mesh and washed by decantation but is preferably re-slurried with additional water to form a pumpable mixture which may be delivered to a dryer wherein the moisture content is reduced to 10–50%. For example, the re-slurried cake may be delivered to a spray dryer wherein the mixture is formed into microspheroidal droplets and passed through heated zones whereby the moisture or water content may be reduced to some lower value such as approximately 20–30%. The discharged, spray-dried material may be re-slurried, filtered and washed, preferably with an ammonium salt solution to keep the cake flocculated and to enable an ion interchange between the sodium and ammonium ions. The resulting cake may then be dried or calcined to the moisture content of the desired finished product and stored.

The invention will be further illustrated in greater detail by the following specific examples. It should be understood that, although these examples may describe in particular detail some of the more specific features of the invention, they are given primarily for the purpose of illustration and the invention in its broader aspects is not to be construed as limited thereto.

*Example 1*

The production of an 87%–13% silica alumina catalyst was as follows: Nine tons (1420 gallons) of 50% sodium hydroxide was measured out of the reserve storage tank and was run into a steam-heated digestor and heater to approximately 100–105° C.

8.2 tons of bauxite ore concentrate (commercial aluminum trihydrate) was weighed out in a hopper and was added to the hot sodium hydroxide to be digested therein. The temperature was brought up rapidly to about 110–112° C., and then more gradually to 117° C. to insure against going above that temperature to avoid undue boiling and frothing. When digestion was substantially complete, water was added to the batch in the digestor to dilute the reaction mixture to 2860 gallons to obtain the preferred concentrations for stability reasons. The sodium aluminate formed by the reaction between the sodium hydroxide and the bauxite ore concentrate contained approximately 28.5% by weight of $Al_2O_3$ and approximately 19.5% by weight of $Na_2O$ and was found to possess stability over a long enough range for the purposes of the invention. The temperature of the concentrate should not be allowed to fall below 75° C. The prepared sodium aluminate was then run into a large steam-heated storage tank from which desired measured quantities may be withdrawn as required, to be fed to the coating tank.

1900 lbs. of hydrated granular silica gel prepared by the acidification of water glass and having a pH approximately in the range 6.4–7.6 was run into a coating tank preparatory to the adding of the sodium aluminate. 26 gallons of 25% sulfuric acid was then added to the aqueous suspension of hydrated silica and this reduced the pH from 6.5–7.5 down approximately to 3.0. 80 gallons (1040 lbs.) of sodium aluminate was withdrawn from the storage tank and was diluted with approximately 51 gallons of water in a dilution tank having a normally open orifice and the diluted solution was run into the coating tank simultaneously with the addition of approximately 140 gallons of 25% sulfuric acid. The addition of these materials to the silica gel raised the pH to approximately 4.0–5.5. The quantity of the sodium aluminate was such as to provide the desired silica-alumina proportion and the quantity of sulfuric acid was such that the sodium aluminate was neutralized to precipitate the aluminum hydroxide under acidic conditions on the hydrated silica gel. Additional sulfuric acid was then added (approximately 10 gallons) to adjust or trim the pH to 4.7. The coated slurry after aging for 30 minutes at this pH was ready for washing and filtration. No particular difficulties were experienced in the removal of sulfates or sodium compounds and the resulting product was found satisfactory for use in the petroleum industry.

In this example, it is to be noted that, due to the prior addition or fore-charge of the 26 gallons of 25% sulfuric acid, the pH is reduced to below 7 and is maintained on the acid side throughout the precipitation by the further acid addition. The precipitation therefore is accomplished under acid conditions whereby the formation of zeolites is avoided and the subsequent removal of sodium is greatly facilitated.

*Example 2*

The sodium aluminate was prepared in very much the same way as described in Example 1, and was run into a storage tank in readiness to be fed to the coating tank.

1885 lbs. of silica gel prepared by precipitation with ammonia from an acid sol was run into the coating tank and the sodium aluminate (76.9 gallons) was added thereto. This provided the desired silica-alumina proportions and caused the pH to rise from approximately 6.4–7.6 to approximately 11. 145 gallons of sulfuric acid was then added with continual pH readings being taken until the pH dropped to approximately 4.7 as a final value. The sodium aluminate was thus neutralized and a precipitate of aluminum hydroxide formed on the silica in the resulting acidic solution. The coated slurry was then aged for approximately 30 minutes and was then ready for washing and filtration. No interference by any difficulty soluble sodium aluminum silicates was encountered during this process and no difficulties were experienced in the removal of sulfates or sodium compounds. The resulting catalyst was considered admirably suited for use in the petroleum industry.

*Example 3*

The hydrated granular silica gel was prepared by the acidification of commercial water glass by the addition of sulfuric acid at a strike temperature of approximately 93–95° F. The time of aging of the silica gel was approximately 15–20 minutes and the percentage of solids present in the slurry was approximately 5%. 1900 lbs. of the silica gel slurry having a pH in the range of approximately 6.4–7.6 was run into a coating tank and held in readiness therein.

6150 lbs. (477 gallons) of 50% sodium hydroxide was measured out of the reserve storage tank and was run into a steam-heated digestor and heated to approximately 100–150° C. 5500 lbs. of bauxite ore concentrate (commercial aluminum trihydrate) was weighed out in a hopper and added to the heated sodium hydroxide to be digested thereby. The steam was maintained on in the digestor to insure against the falling off of the temperature of the digestion mixture. The temperature was then raised rapidly to approximately 110–112° C. and then more gradually up to 117° C. and held at that temperature for sufficient time to insure complete digestion of the bauxite ore concentrate by the sodium hydroxide. When the digestion was substantially completed, water was added to the batch to dilute the mixture to 955 gallons, in order to obtain the preferred concentrations for stability reasons. The sodium aluminate formed by the reaction between the sodium hydroxide and the bauxite ore concentrate was analyzed and was found to contain approximately 28.5% by weight of $Al_2O_3$ and approximately 19.5% by weight of $Na_2O$ and was found to possess sufficient stability over a long enough period of time for the purposes of the present invention.

Approximately 26 gallons of 25% sulfuric acid was then added to the aqueous suspension of hydrated silica in the coating tank and this had the effect of reducing the pH to below 3. 80 gallons (1040 lbs.) of sodium aluminate was diluted to an $Al_2O_3$ concentration of approximately 18% by weight with approximately 50 gallons of water in a dilution tank having a normally open orifice and the diluted solution was run into the coating tank simultaneously with the addition of approximately 140 gallons of 25% sulfuric acid. The addition of the diluted sodium aluminate and the sulfuric acid to the aqueous suspension of hydrated silica gel had the effect of raising the pH from approximately 3 up to approximately 4–5.5. The proportions of the sodium aluminate and sulfuric acid were such that the sodium aluminate (both free and combined hydroxides therein) was neutralized to precipitate the aluminum hydrate under acidic conditions on the hydrated silica gel. Sufficient sulfuric acid was then added, approximately 10 gallons, to trim the final pH to 4.7, at which pH the coated slurry was aged for 30 minutes preparatory to washing and filtering. No particular difficulties were experienced in the removal of sulfates or of sodium compounds and the resulting product was found satisfactory for use in the petroleum industry.

Example 4

To about 62 lbs. of water at approximately 30° C., 15 lbs. of commercial sodium silicate (28.5% $SiO_2$ and 8.85% $Na_2O$) was added in a stainless steel mixer. Approximately 8 lbs. of 25% sulfuric acid was added to the sodium silicate solution over a period of approximately 30 minutes; with 95% of the acid being added at a constant rate during the first 25 minutes and with 5% of the acid being added during the last 5 minutes. A pH of 5.5 was obtained and this was maintained for approximately 30 seconds. The silica gel which had precipitated was then withdrawn from the mixer and was agitated with a slow rate agitation for approximately 30 minutes. The concentration of solids of the hydrated silica gel was determined to be approximately 5.0%.

After the 30-minute aging period, approximately 1 lb. of 25% sulfuric acid (25% of the theoretical amount required to neutralize the aluminate) was added to the aqueous suspension of hydrated silica gel to bring the pH to approximately 2–3. The sodium aluminate ($NaAlO_2$) was added concurrently with the acid but at such a rate that the pH slowly rose. When the solution had reached a pH of 4.2, the acid addition was stopped and the pH was raised to approximately 6.5 by the addition of sodium aluminate alone. The acid addition was then resumed and the pH remained at approximately 6.5 until the 4 lbs. of sodium aluminate solution (15% in $Al_2O_3$) was completely in. At this point the acid was cut and the pH drifted down to a final value of 6.2. Altogether, 97% of the theoretical amount of acid was required.

The silica alumina slurry was then filtered to remove excess water containing salts such as sodium sulfate, and other impurities. The cake from this filter was re-slurried to form a pumpable mixture which was then dried by any suitable means such as by being forced under high pressure through a series of nozzles located in the top of a spray dryer whereby the slurry was transformed into very fine droplets. These droplets were passed downwardly through a stream of hot flue gases and were discharged from the bottom of the spray dryer. This discharged material was then re-slurried, washed, preferably with acidic wash fluids, and filtered and the resulting material was passed through a rotary dryer to remove water as desired to form the finished dried catalyst.

Although the particular alkali used in the examples has been sodium hydroxide, it is to be realized that other alkali metal hydroxides, particularly potassium hydroxide, may be utilized for the digestion of the bauxite ore concentrate. In a similar way, sulfuric acid has been selected as the preferred acid, but it is to be realized that hydrochloric, nitric, or any other mineral acid could be used. As a source material for the silica gel, it is to be appreciated that any other silicate could be used, such as potassium silicate, or the like.

The preferred ratio of $SiO_2$ to $Al_2O_3$ has been set forth as being in the ratio of 87% to 13% in these examples. However, other proportions may be used wherein the ratio of the silica may be in the range from 70–95% and the range of hydrated alumina may be in the range from 5–30%. This may very easily be accomplished by varying the quantities of the materials added in the coating tank. It is also to be realized that other hydrated oxides may be precipitated on the silica gel along with alumina, such as titanium oxide, zirconium oxide, and the like.

From the foregoing, it will be seen that we have provided novel methods of preparation of silica-alumina catalysts wherein the removal of such undesirable materials as alkali metal compounds, ammonium salts, sulfates, and other water-soluble materials, is facilitated, particularly due to the use of required reacting material in smaller quantities. This may be illustrated graphically by a comparison with prior art processes using alum-ammonia coating procedures. In these prior art procedures, aluminum trihydrate was reacted with sulfuric acid to yield aluminum sulfate which was then neutralized by ammonia to precipitate the aluminum hydroxide. These reactions may be represented by the following formulae:

$$2Al(OH)_3 + 3H_2SO_4 \rightarrow Al_2(SO_4)_3 + 6H_2O$$

$$Al_2(SO_4)_3 + 6NH_4OH \rightarrow 2Al(OH)_3 + 3(NH_4)_2SO_4$$

It will be readily apparent that for each mol of aluminum trihydrate ultimately precipitated, 1.5 mols of sulfuric acid and 3 mols of ammonium hydroxide are required.

This is to be compared to the reactions of the present invention wherein bauxite ore concentrate is digested with sodium hydroxide to form sodium aluminate which is then neutralized with sulfuric acid to precipitate the aluminum hydroxide. These reactions may be represented by the following formulae:

$$2Al(OH)_3 + 2NaOH \rightarrow 2NaAlO_2 + 4H_2O$$

$$2NaAlO_2 + H_2SO_4 + 2H_2O \rightarrow 2Al(OH)_3 + Na_2SO_4$$

It will be apparent from these reactions that for each mol of aluminum trihydrate ultimately precipitated, merely 0.5 mol of sulfuric acid and 1.0 mol of sodium hydroxide are required.

These values are based on theoretical considerations and, even though it has been found that amounts slightly greater than the theoretically calculated amounts would be required to carry out the principles of the present invention, the decrease in actual requirements over prior art processes is noteworthy. For example, an increase of up to 25 to 30% sulfuric acid over theoretical requirements may be necessary due to the formation of the basic sulfates and up to a 13–15% increase of caustic may be required for stability reasons or to insure ease of solution. Nevertheless, even including such factors in a comparison, a substantial decrease in requirements is noted. This decrease in the amount of the required reactants thus comprises a feature of the present invention whereby the quantities of undesirable materials to be removed by washing and filtering is considerably decreased. The sulfate salts, for example, introduced by the use of the sulfuric acid, are noted as being reduced to merely one-third of prior coating requirements, involving the use of sulfuric acid and aluminum sulfate.

These beneficial results are obtained, notwithstanding the fact that the quantities of alkali compounds used in the process have been increased over those used in prior art processes. By controlling the precipitation of the aluminum hydroxide by the mineral acid in the presence of the previously and separately precipitated silica gel, the interference of difficulty soluble sodium zeolite compounds is avoided, whereby the washing qualities of the slurry derived is considerably enhanced.

An analysis of the operating costs of the novel methods of the present invention compared to operating costs of prior processes similarly shows marked improvement. This is due partially to the use of several reactants in smaller quantities and also to the fact that more inexpensive materials are required. Additionally, it is to be noted that the direct use of bauxite is permitted, whereby additional economies are effected, as well as providing a ready and available source of raw materials. In this way a greater flexibility is afforded to the industry in thus providing a greater selectivity of raw materials.

Although we have described but a few specific examples of our inventive concept, we consider the same not to be limited to the specific substances mentioned but to include various other compounds of equivalent constitution as set forth in the claims appended hereto. It is understood that any suitable changes and variations may be made without departing from the spirit and scope of the invention.

We claim:

1. A method of forming a silica-alumina slurry suitable for conversion into an alkali metal-free adsorbent gel-type catalyst which comprises adding a mineral acid to a dilute aqueous suspension of hydrated silica gel in an amount sufficient to lower the pH to approximately 0.5–3.5, and then adding an alkali metal aluminate and additional mineral acid simultaneously and in such respective amounts that the total quantity of added mineral acid is sufficient to neutralize the alkali metal aluminate to precipitate aluminum hydroxide on the hydrated silica gel and provide a silica-alumina ratio of between 95:5 and 70:30 in the catalyst.

2. A method of forming a silica-alumina slurry suitable for conversion into an alkali metal-free adsorbent gel-type catalyst which comprises adding sulfuric acid to an aqueous suspension of granular hydrated silica gel having a solids content of from about 3% to about 6% in an amount sufficient to lower the pH to approximately 0.5–3.5, and then adding sodium aluminate containing from about 15% to about 30% $Al_2O_3$ and additional sulfuric acid simultaneously and in such respective amounts that the total quantity of added sulfuric acid is sufficient to neutralize the sodium aluminate to precipitate aluminum hydroxide on the hydrated silica gel and provide a silica-alumina ratio of between 95:5 and 70:30 in the catalyst.

3. A method of forming a silica-alumina slurry suitable for conversion into an alkali metal-free adsorbent gel type catalyst which comprises adding a mineral acid to a dilute aqueous suspension of hydrated silica gel in an amount sufficient to lower the pH to approximately 0.5–3.5, and then adding an alkali metal aluminate in an amount sufficient to provide a silica-alumina ratio of between 95:5 and 70:30 in the catalyst, the quantity of said acid being sufficient to neutralize the alkali metal aluminate to precipitate aluminum hydroxide on the hydrated silica gel.

4. A method of forming an alkali metal-free silica-alumina slurry suitable for conversion into a gel-type catalyst which comprises chemically reacting an acid and an alkali metal aluminate in a dilute aqueous suspension of preformed hydrated silica gel, said acid being in an amount sufficient to neutralize the alkali metal aluminate to precipitate aluminum hydroxide on the hydrated silica gel, and then washing and filtering the silica-alumina slurry to remove alkali metal ions.

5. A method of forming an alkali metal-free silica-alumina slurry suitable for conversion into a gel-type catalyst which comprises chemically reacting a member of the group consisting of hydrochloric acid, nitric acid and sulfuric acid with sodium aluminate in a dilute aqueous suspension of preformed hydrated silica gel, said acid being in an amount sufficient to neutralize the sodium aluminate to precipitate aluminum hydroxide on the hydrated silica gel, and then washing and filtering the silica-alumina slurry to remove sodium ions.

6. A method of forming an alkali metal-free silica-alumina slurry suitable for conversion into a gel-type catalyst which comprises adding an alkali metal aluminate to dilute aqueous suspension of hydrated silica gel in an amount sufficient to provide a silica-alumina ratio of between 95:5 and 70:30 in the catalyst and raise the pH to approximately 11.0, adding a mineral acid in an amount sufficient to neutralize the alkali metal aluminate to precipitate aluminum hydroxide on the hydrated silica gel, and then washing and filtering the silica-alumina slurry to remove alkali metal ions.

7. A method of forming an alkali metal-free silica-alumina slurry suitable for conversion into an adsorbent gel-type catalyst which comprises adding a mineral acid to a dilute aqueous suspension of hydrated silica gel in an amount sufficient to lower the pH to approximately 0.5 to 3.5, adding an alkali metal aluminate and additional mineral acid simultaneously in such respective amounts that the total quantity of added mineral acid is sufficient to neutralize the alkali metal aluminate to precipitate aluminum hydroxide on the hydrated silica gel and provide a silica-alumina ratio of between 95:5 and 70:30 in the catalyst, and then washing and filtering the silica-alumina slurry to remove alkali metal ions.

8. In the manufacture of alkali metal-free catalysts suitable for use in cracking petroleum fractions and containing a major proportion of silica gel activated by a minor proportion of alumina the improvement which comprises preparing a dilute aqueous suspension of hydrated silica gel and adding thereto both a quantity of an aqueous alkali metal aluminate solution such as to form from 5% to 30% of alumina in the finished catalyst and a quantity of mineral acid sufficient to neutralize said alkali metal aluminate and thereby precipitating aluminum hydroxide on the hydrated silica gel and forming a composite gelatinous material from which water-soluble salts can be removed by washing.

9. In the manufacture of alkali metal-free catalysts suitable for use in cracking petroleum fractions and containing a major proportion of silica gel activated by a minor proportion of alumina the improvement which comprises preparing a dilute aqueous suspension of granular hydrated silica gel having a solids content of from about 3% to 6% and adding thereto both a quantity of aqueous sodium aluminate solution such as to form from 5% to 30% of alumina in the finished catalyst and a quantity of a mineral acid sufficient to neutralize said sodium aluminate and thereby precipitating aluminum hydroxide on the hydrated silica gel and forming a composite gelatinous material from which water-soluble salts can be removed by washing.

10. In the manufacture of alkali metal-free catalysts suitable for use in cracking petroleum fractions and containing a major proportion of silica gel activated by a minor proportion of alumina the improvement which comprises preparing an aqueous suspension of hydrated silica gel, adding thereto a quantity of a dilute aqueous alkali metal aluminate solution such as to form from 5% to 30% of alumina in the finished catalyst and then adding a quantity of mineral acid such as to neutralize said alkali metal aluminate and bring the suspension to a pH not higher than 8 and thereby precipitating aluminum hydroxide on the hydrated silica gel and forming a composite gelatinous material from which water-soluble alkali metal salts can be removed by washing.

11. In the manufacture of alkali metal-free catalysts suitable for use in cracking petroleum fractions and containing a major proportion of silica gel activated by a minor proportion of alumina the improvement which comprises preparing a dilute aqueous suspension of hydrated silica gel and adding thereto a quantity of aqueous alkali metal aluminate such as to form from 5% to 30% of alumina in the finished catalyst and a quantity of mineral acid sufficient to neutralize said alkali metal aluminate and thereby precipitating aluminum hydroxide on the hydrated silica gel, drying the resulting alumina-impregnated silica gel, and removing alkali metal salts from the dried gel by washing.

12. In the manufacture of alkali metal-free catalysts suitable for use in cracking petroleum fractions and containing a major proportion of silica gel activated by a minor proportion of alumina the improvement which comprises preparing a dilute aqueous suspension of granular hydrated silica gel, adding thereto a quantity of mineral acid such as to lower the pH to approximately 0.5 to 3.5 and then adding a quantity of an alkali metal aluminate solution such as to introduce from 5% to 30% of alumina into the finished catalyst and an amount of additional mineral acid such that the total quantity of added mineral acid is sufficient to neutralize said alkali metal aluminate, said quantities of aluminate and acid being added simultaneously and at rates such as to bring the final pH of the hydrated silica gel slurry to approximately 4.0–5.5, and thereby precipitating aluminum hydroxide on the hydrated silica gel and forming a composite gelatinous material from which water-soluble salts can be removed by washing.

References Cited in the file of this patent

UNITED STATES PATENTS

| | | |
|---|---|---|
| 2,271,319 | Thomas et al. | Jan. 27, 1942 |
| 2,285,396 | Danforth et al. | June 9, 1942 |
| 2,326,706 | Thomas et al. | Aug. 10, 1943 |
| 2,334,871 | Free et al. | Nov. 23, 1943 |
| 2,398,610 | Bailey et al. | Apr. 16, 1946 |
| 2,500,197 | Michael | Mar. 14, 1950 |
| 2,548,860 | Bond | Apr. 17, 1951 |